United States Patent
Herzig

(10) Patent No.: US 8,820,625 B2
(45) Date of Patent: Sep. 2, 2014

(54) SYSTEMS AND METHODS FOR BARCODE INTEGRATION IN PACKAGING DESIGN AND PRINTING

(75) Inventor: John Herzig, Richmond Hill (CA)

(73) Assignee: Barcode Graphics, Inc., Richmond Hill (CA)

( * ) Notice: Subject to any disclaimer, the term of this patent is extended or adjusted under 35 U.S.C. 154(b) by 781 days.

(21) Appl. No.: 12/940,954

(22) Filed: Nov. 5, 2010

(65) Prior Publication Data

US 2012/0111934 A1    May 10, 2012

(51) Int. Cl.
    G06F 17/00    (2006.01)
    G06K 7/10     (2006.01)
    G06K 19/06    (2006.01)

(52) U.S. Cl.
    USPC ............ 235/375; 235/462.01; 235/494

(58) Field of Classification Search
    USPC ............... 235/375, 462.01, 494, 454
    See application file for complete search history.

(56) References Cited

U.S. PATENT DOCUMENTS

| | | | |
|---|---|---|---|
| 5,387,783 A * | 2/1995 | Mihm et al. | 235/375 |
| 5,724,491 A * | 3/1998 | Kashihara | 358/1.18 |
| 5,850,080 A | 12/1998 | Herzig | |
| 6,042,011 A * | 3/2000 | Park et al. | 235/462.01 |
| 6,533,175 B1 | 3/2003 | Herzig et al. | |
| 6,832,726 B2 * | 12/2004 | Torchalski | 235/462.25 |
| 6,873,435 B1 * | 3/2005 | Tehranchi et al. | 358/1.9 |
| 7,185,824 B2 * | 3/2007 | Hepworth et al. | 235/494 |
| 2004/0017928 A1 * | 1/2004 | Herzig et al. | 382/101 |
| 2005/0283448 A1 * | 12/2005 | Dixon et al. | 705/408 |
| 2010/0147960 A1 * | 6/2010 | Bailey | 235/494 |

* cited by examiner

*Primary Examiner* — Thien M Le
*Assistant Examiner* — April Taylor
(74) *Attorney, Agent, or Firm* — Knobbe, Martens, Olson & Bear LLP

(57) ABSTRACT

Methods and systems for barcode integration in packaging design and printing are described. A barcode server may supply an FPO barcode to a designer, and the FPO barcode may include a selectable link that, when selected, generates an HTTP request to the barcode server associated with the specific FPO barcode. The barcode server manages the finalization and approval processes from design to prepress and printing.

20 Claims, 6 Drawing Sheets

US 8,820,625 B2

SYSTEMS AND METHODS FOR BARCODE INTEGRATION IN PACKAGING DESIGN AND PRINTING

TECHNICAL FIELD

The present application relates to barcodes and, in particular, to systems and methods for integrating barcodes into packaging design and printing.

BACKGROUND

Barcodes are a commonplace mechanism for encoding short pieces of data in a machine-readable format. They are ubiquitous in consumer packaging in the well-known Universal Product Code (UPC) symbology, which is a linear or 1-dimensional (1D) barcode. Outside of North America, product numbers are encoded in the European Article Number (EAN) symbology, which is also a 1D barcode. Other symbologies are becoming increasingly popular for a variety of applications, including QR-codes, Datamatrix, PDF 417, and other 2-D, or even 3-D, codes.

Packaging for products typically requires a scannable barcode that encodes the associated UPC or EAN. There are various associations and standards groups that publish guidelines and requirements for a scannable printed barcode. Failure to adhere to these standards can render a printed barcode unreadable, which can result in the imposition of serious monetary penalties on the consumer products manufacturer or packaging company by retailers. In some cases, retailers may refuse to stock product from a consumer products company that repeatedly provides packaging that has erroneous or unscannable barcodes.

Accordingly, it is important to produce printed consumer packaging with accurate barcodes that meet the compliance parameters for readability. Unfortunately, the packaging design process has a number of points at which human error can result in errors in the barcode ultimately printed on the packaging. Such errors can prove embarrassing and costly for the package designer, prepress operator, printing press operator, and Consumer Packaged Goods (CPG) Brand Owner.

BRIEF DESCRIPTION OF THE DRAWINGS

Reference will now be made, by way of example, to the accompanying drawings which show example embodiments of the present application.

Similar reference numerals may have been used in different figures to denote similar components.

SUMMARY

In one aspect, the present application describes a method of generating barcode at a server. The method performed by the server includes receiving a request for a barcode from a remote system, the request including a product number to be encoded in the barcode and product information; generating an For Position Only (FPO) barcode encoding the product number; assigning a unique identifier to the generated FPO barcode; generating an FPO barcode image, wherein the FPO barcode image includes the generated FPO barcode and a selectable link to the server, wherein the selectable link contains the unique identifier; and transmitting the FPO barcode image to the remote system.

In another aspect, the present application describes a method of generating a final barcode at a server. The method performed by the server includes receiving a request from a prepress system for a final barcode, wherein the request includes a unique identifier; associating the unique identifier with an FPO barcode stored at the server, wherein the FPO barcode encodes a product number; verifying that the FPO barcode has a Consumer Packaging Goods (CPG) approval recorded in association therewith; receiving at least one printing parameter from the prepress system; generating the final barcode encoding the product number based, in part, on the at least one printing parameter; and transmitting the final barcode image to the prepress system.

In yet a further aspect, the present application provides a method of storing printing press data, the printing press including at least one barcode verifier configured to read barcodes printed by the printing press and to output printing characteristics. The method includes measuring characteristics of a plurality of printed final barcodes on printed packaging during a print run; scanning an ID barcode in a waste area of at least one of the printed packages to obtain an ID number; and transmitting the ID number and the measured characteristics of the plurality of printed final barcodes to a remote barcode server for storage in association with the printing press.

Other aspects of the present application will be apparent to those of ordinary skill in the art from a review of the following detailed description in conjunction with the drawings.

DETAILED DESCRIPTION

Embodiments of the present application are not limited to any particular operating system, server architecture, or computer programming language.

In this application, the term "barcode" is used to refer to any one of a variety of images that encode information using visual elements, excluding text. Example barcodes include linear or 1-D barcodes, like UPC or EAN, and 2-D barcodes, like Datamatrix, QR codes, PDF 417, and many others.

Figure 1:
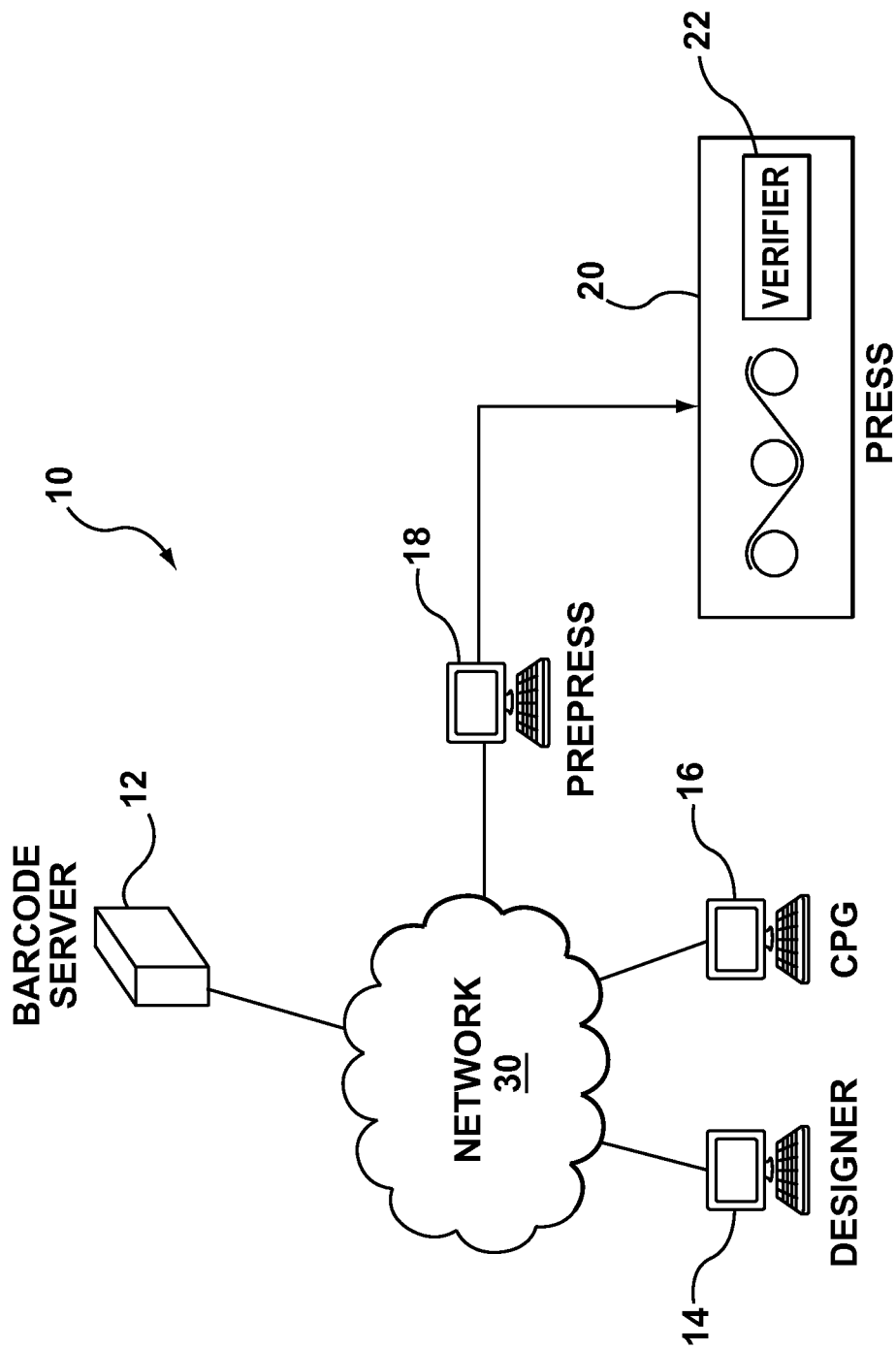
FIG. 1 shows, in block diagram form, a system for packaging design and printing.

Reference is first made to FIG. 1 to illustrate the packaging design and production process 10. A number of entities are involved in the packaging and design production process 10. Packaging of goods occurs on behalf of the goods owner, sometimes referred to as the Consumer Packaging Goods (CPG) owner 16. This entity oversees the design process and retains final approval on design decisions. The CPG owner 16 retains and instructs a packaging designer 14. The designer 14 creates an initial electronic design and layout for the package, typically using commercial packaging design software, such as Adobe™ Illustrator™, or another such software product. Although referred to herein as entities, such as the designer 14 and owner 16, it will be appreciated that the process 10 illustrated herein is implemented by terminals or systems at those locations configured to communicate over a computer network 30, as will be described below.

Consumer packaging typically must include certain regulated information, such as Nutrition Facts Tables (for food products) and barcodes. In particular, most packaging requires a scannable 1D barcode conforming to the UPC standard or, outside of North America, the EAN standard. It is understood that the packaging requirements may evolve to include 2D barcodes or other symbology for automated checkout, and the present application is intended to apply to those evolutions as well.

The designer 14 tasked with creating a packaging design must account for the need to place a barcode in the design. Typically, the designer 14 will reserve space on the packaging design by placing a barcode-sized block marked as "For Position Only" or "FPO". In many instances, this FPO barcode will appear like a regular barcode, but it encodes a string of zeros or other data unrelated to the actual UPC associated with the goods. It may be marked with the text "FPO".

In accordance with the present application, the designer 14 may obtain the FPO barcode from a third party barcode generation service, for example from barcode server 12. The designer 14 may contact the barcode server 12 through network 30 and may submit a request for a barcode. The request may specify the UPC number for the goods, and the barcode server 12 may generate and return an image (in PDF, JPEG, or other image or mark-up language formats) of the generated barcode that encodes the UPC number. In some cases, the packaging designer may mark the barcode image as "FPO", and in some other cases, the barcode server 12 may supply the designer with an image already marked "FPO".

Once the designer 14 has generated the packaging design, the designer 14 submits the proposed design to the CPG owner 16. This may occur in hardcopy form or by transmitting an electronic copy of the design to the CPG owner 16 via email for example. If the CPG owner 16 rejects the design, the CPG owner 16 informs the designer 14 and may provide further instructions on desired modifications to guide the designer 14. If the CPG owner 16 approves of the design, the CPG owner 16 forwards the packaging design to prepress 18.

At prepress 18 the design is reviewed and prepared for printing. This typically includes replacing the FPO barcode with a proper scannable barcode, referred to herein as the "final" barcode. The prepress 18 may request the generation of the final barcode from a third party service, such as barcode server 12. The prepress 18 enters the data to the barcode server 12 necessary to generate the final barcode. The final barcode may differ from the FPO barcode in that it must encode the UPC symbol, and its characteristics will be based upon parameters associated with the printing press intended to be used for the printing job. The printing press will have certain characteristics that are known to the prepress 18, such as the extent to which the ink will spread on printing (sometimes referred to as "gain"). Accordingly, one of the parameters specified by the prepress 18 in adjusting or generating the final barcode is line width reduction (LWR). The prepress 18 may also specify color and any other features of the print job that might impact the characteristics of the final barcode, and therefore may be taken into account in generating the specific characteristics of the final barcode.

The prepress 18 may contact the CPG owner 16 to obtain final approval on the print job. The prepress 18 may forward a hardcopy or electronic copy of the final packaging design to the CPG owner 16 for approval. If the CPG owner 16 approves of the design, then the prepress 18 causes printing plates to be generated from the final packaging design and the printing plates are used by a printing press 20 to run the print job.

The printing press 20 includes one or more verifiers 22. As the print job is run, the verifier 22 is used to scan the printed UPC symbol of a sampling of the printed packages in order to verify that the barcodes are readable and attain passing ANSI/ISO grades. In addition, one or more of the printed packages may be sent to a third party service that performs certification services to verify that the print job has resulted in a readable barcode that complies with requirements.

In some instances, printing errors occur that compromise the quality of the print job. In particular, data entry errors by the designer 14 or prepress 18 may not be caught and may result in errors in the final printing, including errors in the barcode itself. In some instances, the error may be in the UPC number, rendering the packaging unusable. In some cases, the error may be related to the scannability of the package, such as poor opacity of reflective background substrate, poor contrast between bars and background, too small a size, etc.

On occasion, the prepress 18 may omit to replace the FPO barcode with the final barcode. This error may not be caught before the print job occurs; indeed in some instances product is shipped to retail locations with such errors in the printing, which can result in serious monetary penalties for the CPG owner 16.

Figure 2:
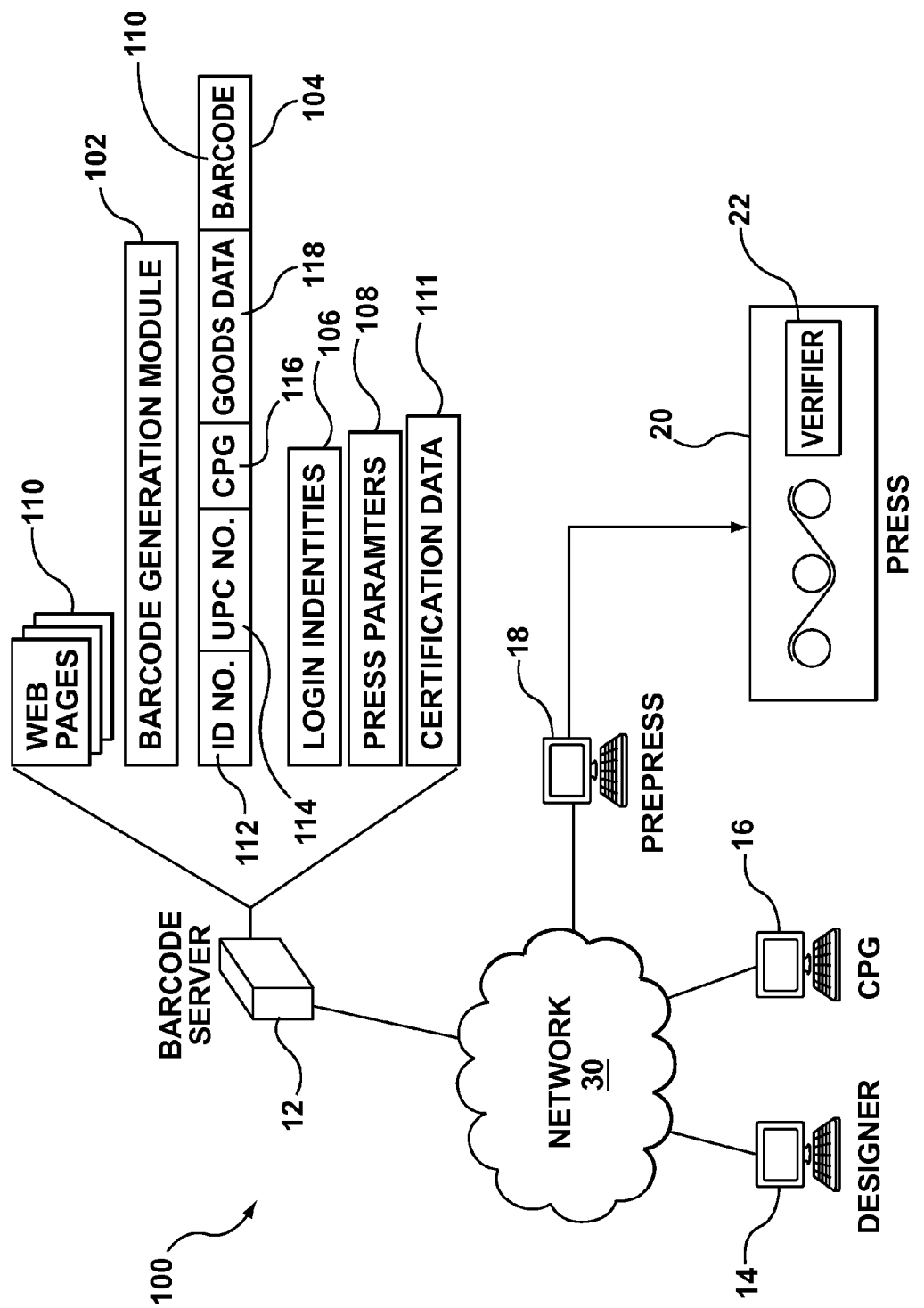
FIG. 2 shows, in block diagram form, a system for integrating barcode generation into packaging design and printing.

Reference is now made to FIG. 2, which shows a system 100 for integrating barcode generation into a packaging design process.

The system 100 includes the designer 14, the CPG owner 16, the prepress 18, and the barcode server 12 interconnected by network 30. The system 100 further includes the printing press 20 and associated verifier(s) 22. The verifier 22 may also be connected to barcode server 12 via one or more communication networks, including network 30. The network 30 may include one or more private or public communication networks, whether wired, wireless, or both, and may include the Internet.

The designer 14, CPG owner 16 and prepress 18 include one or more terminals/computers/systems configured to connect to and communicate over the network 30. The computers may include desktop, laptop, netbook, tablet, mobile phone, or other computing devices. The designer 14 computer terminal is configured to operate a packaging design software application program to enable the design and configuration of a packaging design. In some cases, the designer 14 computer terminal includes a web browser or other software package for sending mark-up language requests and viewing mark-up language documents received in response, including HTML, XML, XHTML, PDF and other document types. In some cases, the browser is integrated with the packaging design software and, in other cases, the browser is a separate software package.

The barcode server 12 is a computing device having a processor and associated memory and configured to connect with and communicate over the network 30. The barcode server 12 may be configured to operate as a web server and may include an HTTP daemon for handing and responding to HTTP requests.

The barcode server 12 may include a barcode generation module 102 which, when executed by the processor, configures the processor to generate an image of a barcode that encodes a number, such as a UPC or EAN number. The barcode generation module 102 may be configured to accept various inputs including the barcode type, UPC number, size or dimension parameters, color selection, and other data used to generate the image of the barcode.

The barcode server 12 may store barcode data 104. The barcode data 104 may include the image of the barcode 110 and other associated data, such as an ID number 112 assigned to the barcode job, the UPC number 114 that the barcode encodes, the CPG owner 116 for whom the barcode has been generated, and associated goods data 118. The associated goods data 118 may includes one or more descriptors for the goods, CPG owner data, the barcode symbology, or other such data. The barcode data 104 may include other data (not illustrated) including a barcode status indicator (e.g. FPO, approved FPO, final, approved final, etc.), printing press identifier (if any), etc. For example, the barcode data 104 may include or may be associated with certification data 111. The certification data 111 may include test results from third-party certification services, for example, that have tested the barcode 110, whether at the design stage or after a print run, etc.

Although FIG. 2 diagrammatically shows the barcode data 104 as being stored together, it will be appreciated that the data may be stored in any manner and suitably linked or otherwise associated. The barcode data 104 may be arranged in a database format, including a searchable or relational database format, or in any other data structure.

The barcode server 12 may further store login identities 106. Each individual user or entity may be assigned a login identity, including a username and password or other verifier, when that user or entity registers with the barcode server 12. The barcode server 12 may be configured to classify users/entities in accordance with their respective roles in the packaging design process. That is to say, the login identities 106 may be associated with roles such as designers, CPG owners, prepress users, press operators, third-party barcode certifiers, etc. Each class or role of login identity may have certain permissions associated with it. For example, designers may be provided with the option of ordering FPO barcodes, but not with the capability of approving of final barcode designs; prepress users may be provided with the capability of ordering a final barcode based on a given FPO barcode, but not the capability of editing certain parameters of an existing FPO barcode that has been approved by the CPG owner. Other possible role-based capabilities of the various classes of identities will be understood in view of the description below.

The barcode server 12 further includes web pages 110 for interacting with the users/entities accessing the barcode server 12. For example, the web pages 110 may include a general login page, role-specific pages, and administrator pages. Role-specific pages may include, for example, a designer page(s) through which the designer may initiate a request for an FPO barcode, review or edit an existing FPO barcode order, etc. The CPG owner page(s) may permit a CPG owner to review an existing FPO or final barcode and select approval/rejection, with or without comments/feedback. The CPG owner page(s) may also permit a CPG owner to review third-party certification results, such as may be included in the associated certification data 111.

The web pages 110 may also include dynamically generated web pages in some embodiments. For example, the web pages may be dynamically generated based on a barcode ID number to display the image of the barcode and, in some cases, associated data. In some cases, the dynamically-generated web pages may be generated in response to selection of a link associated with the barcode ID number, thereby resulting in receipt of an HTTP request at the barcode server 12 wherein the HTTP request includes the barcode ID number. The HTTP request with the barcode ID number may result in generation of a login screen, following which, after successful login, the barcode server 12 generates or selects a web page corresponding to the class of user accessing the barcode server 12 and relating to the barcode ID number. Examples are provided below in connection with illustrations of example embodiments of a packaging design process.

The barcode server 12 may further include printing press parameters 108. The press parameters 108 may include measurements and statistics obtained from one or more barcode verifiers 22 for a given printing press 20. The press parameters 108 may include historical data, and may include data derived from the historical data. For example, the press parameters 108 may include press gain (ink spread) data based on historical measurements, such as an average, or a weighted average. The press parameters may further include thresholds related to the measurements, such as a maximum magnification threshold, a minimum LWR parameter, etc. Further information regarding the gathering of press parameters 108 is detailed later below in connection with FIG. 7.

The press parameters 108 may be used by the barcode generation module 102 to test input received through one of the web pages 110 regarding a printing-related parameter, or it may be used by the barcode generation module 102 to provide suggested settings/parameters to a prepress user for a given barcode printing job or press site, for example a range of acceptable LWR parameters for a given magnification, symbology and print process.

Figure 3:
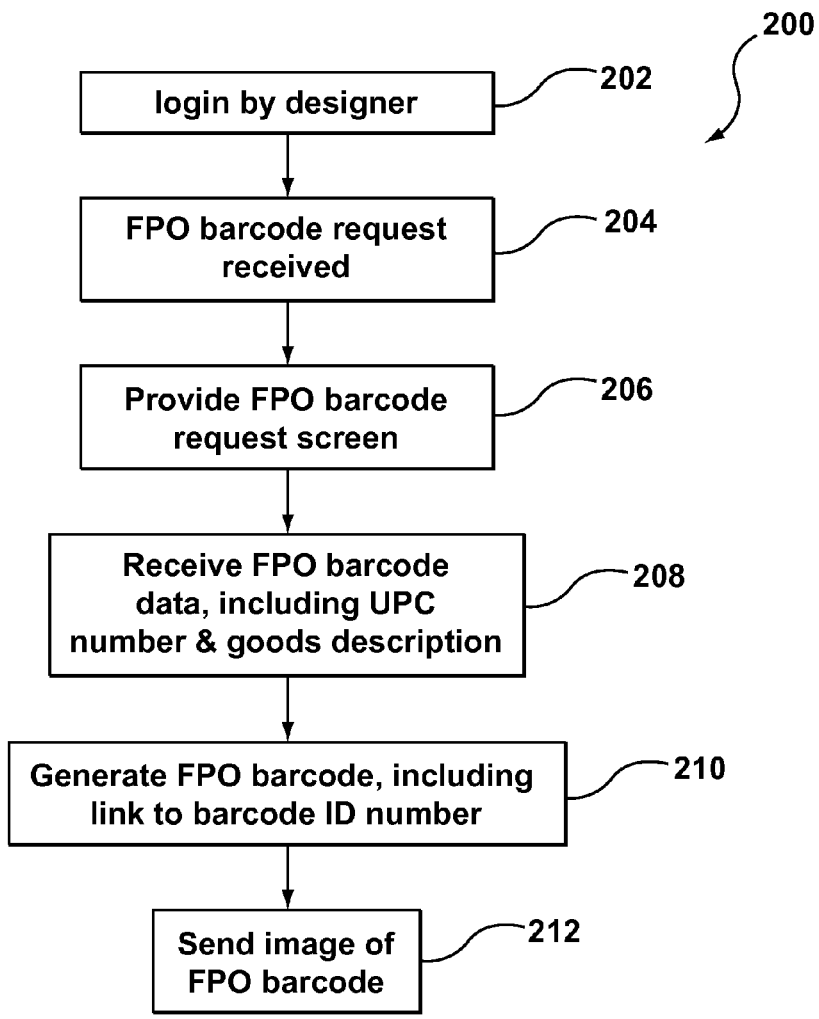
FIG. 3 shows, in flowchart form, an example method for generating an FPO barcode.

Reference will now be made to FIG. 3, which shows, in flowchart form, an example method 200 for integrating barcode generation into a packaging design process. The method 200 includes a successful login by a designer in operation 202. This may include receipt of a username and password through a login screen, verification of the authenticity of the username and password based on stored login identities 106 (FIG. 2), and determination from the stored login identity that the user is classed as a designer.

On successful login, the designer may be presented with a web page or screen showing various selectable options, one of which may be generation of a new barcode. Accordingly, the method 200 in this embodiment includes receiving a request for a new FPO barcode in operation 204. This may include receiving selection of a button or other GUI element associated with generating a new barcode. In response, the barcode server 12 (FIG. 2) provides the designer with an FPO barcode request screen 206. In some instances this may implemented as a web page, a pop-up, or in any other fashion. The FPO barcode request screen provides the designer with the ability to input or select various parameters. For example, the screen may provide for input of the number to be encoded, such as a UPC or EAN number, a goods description, etc. In some cases, the inputs may be selectable from a pre-populated list (e.g. pull-down menu), such as a list of barcode symbologies. The designer may also input the magnification of the barcode and, optionally, a color for the bars.

In operation 208, the barcode server 12 receives the FPO barcode data through the FPO barcode request screen, including the UPC number, goods description, etc. Using the FPO data, the barcode server 12 assigns a barcode ID number and generates an FPO barcode in operation 210. The FPO barcode includes the encoding of the UPC number in accordance with the selected barcode symbology (e.g. UPC-A, etc.), and the overlaying of the generated barcode with a text box. The text box may include the text "FPO", or a similar indicator. In some instances it may provide other text data, such as a goods description, CPG data, symbology identifier, etc. The generated barcode and text box are implemented as an image in an imaging or mark-up language format capable of implementing a hyperlink. For example, the barcode may be in PDF format.

The text box in the barcode image further includes a selectable link. The selectable link is a link associated with the barcode ID number. For example, the selectable link may be a hyperlink to a dedicated page on the barcode server 12 associated with the barcode ID number. In another example, the selectable link may be a hyperlink to the barcode server 12 and may include the barcode ID number as a parameter in the HTTP request.

The FPO barcode image is then sent to the designer in operation 212. In some instances, the server may also send a pre-site automation barcode.

Figure 4:
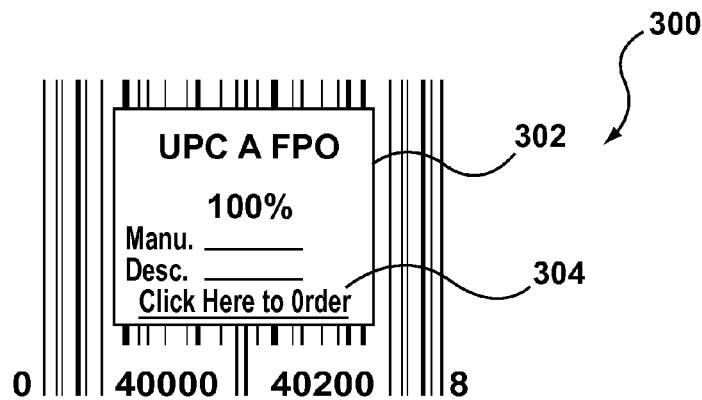
FIG. 4 shows an example FPO barcode having a selectable link.

An example FPO barcode 300 is shown in FIG. 4. The FPO barcode 300 shows the encoding of UPC number 040000402008 using symbology UPC-A. A text box 302 appears atop the barcode. The text box 302 includes text, such as the UPC symbology used, the fact it is an "FPO" barcode, the magnification level (100% in this case), a manufacturer description, and a goods description. The text box 302 further includes selectable link 304.

When the example FPO barcode 300 is placed in a packaging design by the designer, the image of the FPO barcode 300 is pasted into the electronic image of the packaging design and is placed appropriately by the designer in the desired location. In this electronic format, the selectable link 304 will, if clicked, cause the viewing software, such as Adobe™ Acrobat™, to generate an HTTP request to access the location specified by the selectable link 304, or will cause associated browser software to generate such an HTTP request. The selectable link may include the address of the barcode server 12 (FIG. 2) and the barcode ID number (for example as a token or other parameter).

Once the designer has created the packaging design and inserted and positioned the FPO barcode 300, the designer sends an electronic file containing the packaging design to the CPG owner. This may be done using email, FTP, physically using computer-readable memory, such as a flash drive, or in any other suitable manner. The CPG owner reviews the packaging design. The CPG owner may provide the designer with feedback regarding design elements that the CPG owner would like updated or changed. This may result in the designer revising and re-transmitting the packaging design file to the CPG owner.

As noted above, the packaging design includes the FPO barcode 300, which includes the selectable link 304. The CPG owner reviewing the packaging design uses a mark-up language or image viewing application, such as Adobe™ Acrobat™. The application is one which is capable of recognizing, and allowing for selection of, embedded links.

The CPG owner selects the selectable link 304, which causes the mark-up language viewing program or an associated browser to generate and send an HTTP request to access the address embedded in the selectable link 304. In particular, the HTTP request is addressed to the barcode server 12. The HTTP request includes an association with the barcode ID number corresponding to the FPO barcode 300. This may be implemented as a token or other parameter in the HTTP request. It will be appreciated that the present application is not limited to any particular implementation of the selectable link 304. The barcode server 12 will, in response to the request, prompt the CPG owner to login, following which it will provide the CPG owner with the option of approving or disapproving of the FPO barcode. The CPG owner is thus given an opportunity to review the uploaded parameters and FPO data supplied to the barcode server 12 by the designer and to confirm that this data matches the goods and corresponds with their own records. Other things that the CPG owner may be prompted to check may be customized to a CPG owners QA policy. In some cases, the results of design-stage testing performed by a third-party quality certification service provider may be shown.

Figure 5:
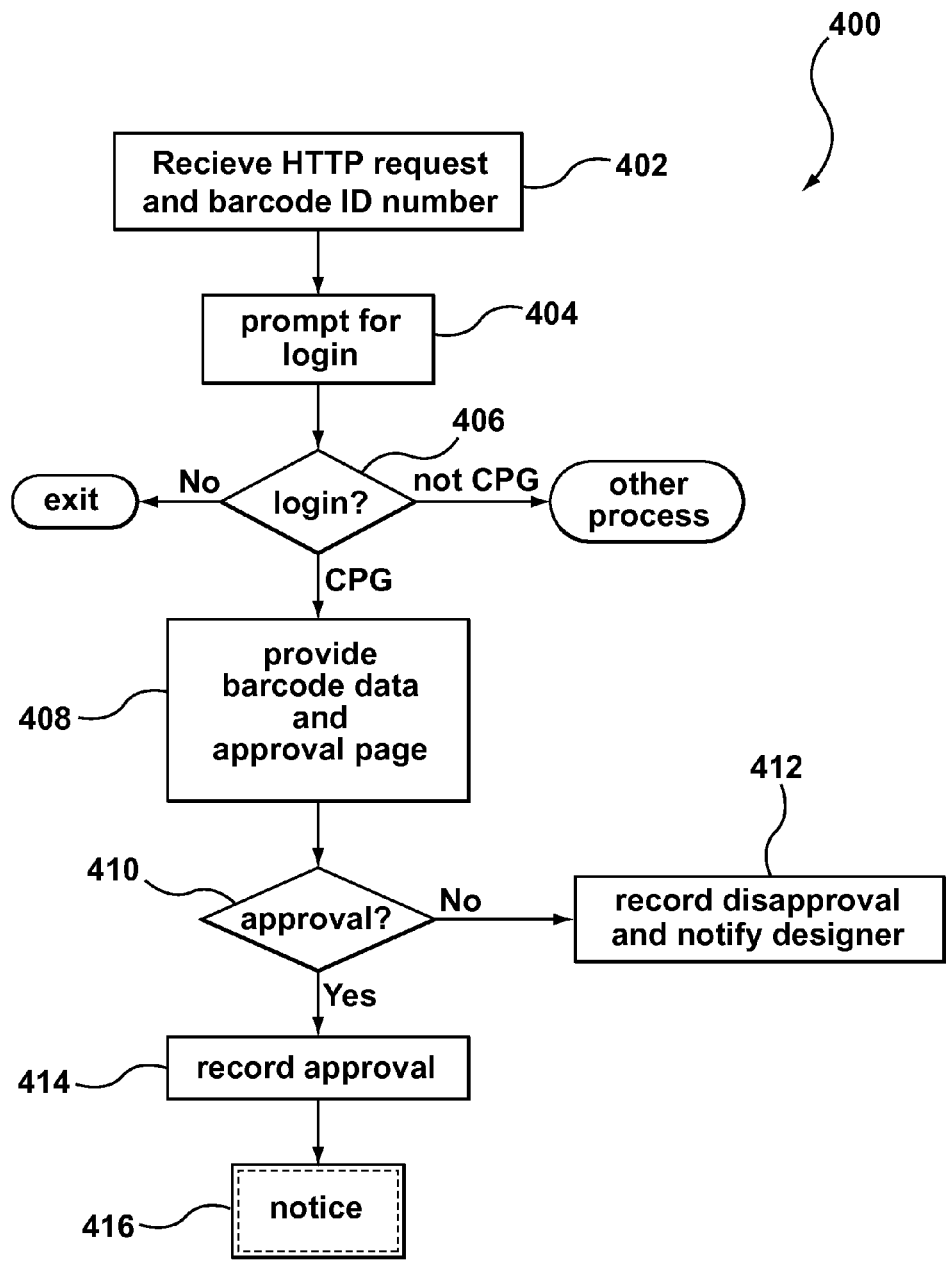
FIG. 5 shows, in flowchart form, an example method for recording approval of an FPO barcode.

Reference is now made to FIG. 5, which shows, in flow-chart form, a further example method 400 for integrating barcode generation into the packaging design process. The method 400 begins with receipt of the HTTP request from a CPG terminal or system in response to selection of the selectable link 304 (FIG. 4) on an FPO barcode image, as indicated by operation 402. The HTTP request includes a token or other parameter associated with the barcode ID number, which enables the barcode server 12 (FIG. 2) to retrieve the barcode data 104 (FIG. 2) associated with that barcode ID number.

In operation 404, the barcode server 12 responds to the HTTP request with a prompt to login. This may include providing a login page or pop-up. Login information is received in operation 406 and the class of user is identified by reference to the login identities 106 (FIG. 2). If the user that has logged on is the CPG owner associated with the barcode ID number, then the method 400 continues to operation 408. If the user that has logged on is the prepress operator, press operator, or designer associated with the barcode ID number, the barcode server 12 may provide different options or information, as may be discussed further below. If the user that has logged on is not associated with the barcode ID number, e.g. a different CPG owner, or a user at the CPG owner that does not have sufficient authorization to review and approve designs, then the barcode server 12 may provide a different screen with a set of operations or options unconnected with the specific barcode ID number sent in the HTTP request. For example, in one example implementation the CPG owner or user associated with a particular CPG may be associated with the corresponding Manufacturer Prefix Number owned by that CPG. The Manufacturer Prefix Number is the prefix of the UPC/EAN/SCC barcode. Operation 406 may include verifying that the CPG owner that has logged in has a Manufacturer Prefix Number corresponding to the barcode.

In operation 408, the CPG owner is provided with the details of the barcode job obtained from the stored barcode data 104 (FIG. 2). The CPG owner may further be provided with the image of the barcode 110 (FIG. 2) to compare to the FPO barcode that the designer has placed in the packaging design.

The CPG owner may be provided with a checklist of items to consider in evaluating the FPO barcode. The checklist may, in some embodiments, require that the CPG owner click or check the items to indicate that the FPO barcode has been reviewed and complies with those requirements or features. In some embodiments, if third-party certification results, or in-house QA results, are available and stored as certification data on the server, then they may also be displayed or available for display to the CPG owner.

The CPG owner is also provided with the option of approving or disapproving of the FPO barcode, as indicated by operation 410. If the CPG owner disapproves of the FPO barcode (for example, because the UPC number is incorrect) then the barcode server 12 receives the disapproval (such as through selection of a disapproval button on the web page and corresponding receipt of an HTTP message), and records the disapproval in operation 412. Recordal may include updating the barcode data 104 to reflect the barcode status as "FPO disapproved". The barcode server 12 may further record the identity of the specific individual at the CPG owner that disapproved and a timestamp or other data. In some embodiments, the CPG owner may input comments/text so as to indicate why the FPO barcode was disapproved. In some embodiments, a list of common reasons may be provided from which the CPG owner may select (e.g. incorrect UPC number, incorrect color, etc.).

Operation 412 may further include sending notification to the designer that the FPO barcode was disapproved by the CPG owner. This notification may be in the form of an email, text message, instant message, or in any other such form. If reasons have been provided, then they may be included in the notification message. If a prepress site has taken delivery of the Final barcode before the disapproval was entered by the CPG, then the prepress site may also be provided with such a notification.

If the CPG owner approves of the FPO barcode, then the approval is recorded along with any other associated information, such as CPG user identity, etc., in operation 414. In some embodiments, approval may also result in sending of a notification to the designer that the FPO barcode was accepted by the CPG owner, as indicated by operation 416.

The CPG owner, eventually having approved of the packaging design, forwards the electronic packaging design file (or instructs the designer to forward the packaging design file) to prepress 18 (FIG. 2). At prepress 18, a final barcode must be obtained and must be inserted in the design in place of the FPO barcode. The FPO barcode may be removed from the design or the final barcode may be layered atop the FPO barcode and the FPO made invisible by the prepress operator.

The prepress 18, having received the packaging design file, activates the selectable link in the FPO barcode 300 (FIG. 4) to access the barcode server 12.

Figure 6:
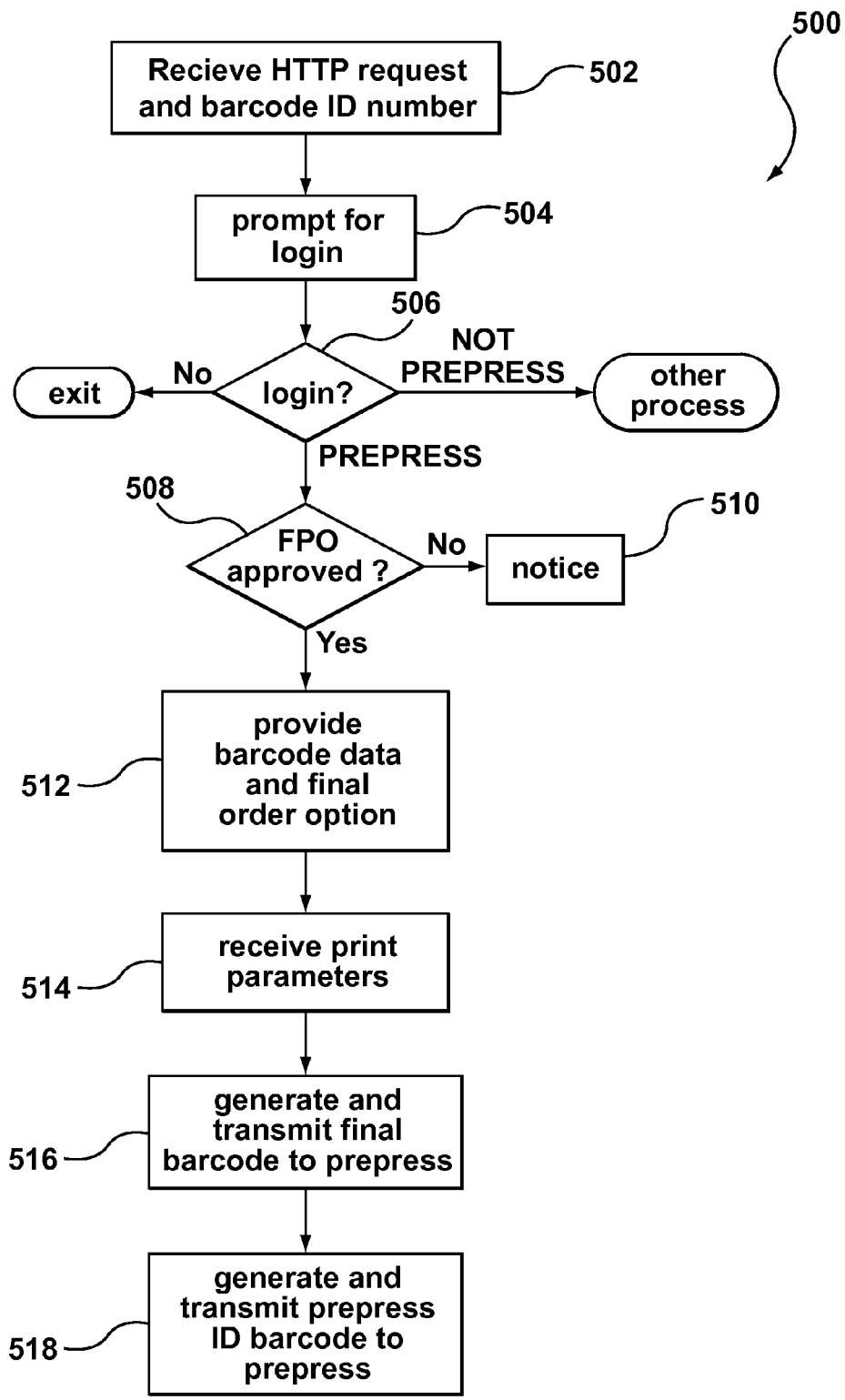
FIG. 6 shows, in flowchart form, an example method for generating a final barcode.

Reference is now made to FIG. 6, which shows, in flowchart form, a further example method 500 for integrating barcode generation into the packaging design process. Like method 400, method 500 begins in operation 502 with the barcode server 12 (FIG. 2) receiving the HTTP request with the associated barcode ID number that results from selection of the selectable link 304 (FIG. 4). In response, the server prompts for login in operation 504.

In this case, the login information received in operation 506 may be attributed to a prepress user based on the login identities 106 (FIG. 2), in which case the method 500 continues to operation 508. If the login is by the associated CPG owner, then the method 400 of FIG. 4 is followed.

In operation 508, a check may be made as to whether the FPO barcode has been approved by the CPG owner. If not, then in operation 510 the prepress user may be notified, for example by web page or pop-up, that the FPO barcode has not been approved. The prepress user may be unable to order a final barcode until the CPG owner has recorded its approval of the FPO barcode.

If the FPO barcode has been approved, then in operation 512 the prepress user is provided with associated barcode data and final barcode order options. In some embodiments, the prepress user is not permitted to edit or change any or some of the barcode data. For example, the prepress user may not be permitted to change the UPC number, the goods description, etc. There may be certain parameters or fields that the prepress user is permitted to edit. In fact, there may be certain parameters or fields that the prepress user must supply before a barcode can be finalized, such as, for example, the line width reduction. As indicated by operation 514, print parameters may be received at the barcode server 12 from the prepress user. Example print parameters may include line width reduction, color, magnification other than that chosen earlier by the designer, bearer bar width, knockout type, etc.

In some instances, the web page generated by the barcode server 12 may provide selectable options. For example, a list of colors may be provided. In another example, a range of line width reductions may be offered.

In yet another example, a printing process may be selected from a list of known printing processes having identifiers in the system. The press parameters 108 may be used as thresholds for testing the print parameters input by the prepress user. For example, for a certain magnification, symbology, and print process combination, a range of permissible line width reductions may be predetermined or calculated. Input of a line width reduction parameter outside the range may result in an error message to the prepress user and a prompt to enter a value within the range.

As with the CPG owner, the barcode server 12 may provide the prepress user with a checklist of items to consider in some embodiments. In some cases, if a third-party certifier or in-house QA testing software has provided certification results, those results may be made available for display to the prepress user.

Once the prepress user has provided the input print parameters in operation 514, then the barcode server 12 generates and sends the final barcode in operation 516. The final barcode may be downloaded to the prepress user as a PDF file or other file type. In some embodiments, it may be sent by email, as an attachment to a message, or in any other manner suitable for transmission of a mark-up language image. In some embodiments data that previously appeared within the FPO barcode box, as well as details about the final barcode, may be provided within the data structure of the final barcode as metadata, or a data dictionary.

The final barcode is to be placed in the electronic packaging design in place of the FPO barcode by the prepress user.

In some embodiments, the barcode server 12 may further generate and send a prepress ID barcode to the prepress user. A prepress ID barcode is a barcode encoding a unique prepress ID number generated by the barcode server 12 and associated with the final barcode and/or the prepress site. In some embodiments, the prepress ID may be the same as the barcode ID used earlier in the process; however, in other embodiments it may be different. The prepress ID barcode may also have textual data located on or near the barcode, such as a goods description. In addition, the prepress ID barcode may include a selectable link associated with the prepress ID, similar to or identical to the selectable link on the FPO barcode. The prepress ID barcode may be in PDF format or other suitable mark-up language format.

The prepress ID barcode is intended to be placed in the electronic packaging design in a waste area of the packaging design outside the perimeter of the packaging, but somewhere on the printable area. The "waste area" is that portion of a print substrate (press sheet, plastic film, etc.) that is material that will be discarded in forming the final package. This enables users accessing the electronic packaging design to see and activate the selectable link and enables press operators to scan the prepress ID barcode after printing, using a verifier for example.

In some embodiments, the prepress user may be provided with a downloadable application or plug-in, for example a plug-in to a PDF editor such as Adobe™ Illustrator™, that is configured to test the placement of the final barcode and confirm it corresponds to the FPO barcode already in the packaging design. In this regard the plug-in may determine whether the encoded number in the final barcode, prepress ID barcode, and/or FPO barcode match. It may further confirm that the symbology used is the same and that additional parameters, such as magnification, rotation, quiet spaces, etc., are all the same in both the FPO and Final barcodes. It may further confirm that the final barcode has been placed in the same location within the packaging design as the FPO barcode. Mismatches or errors may result in a notification message to the prepress user regarding the detected problem and proposed corrections or solutions.

Once the prepress user has placed the final barcode correctly in the packaging design and has otherwise confirmed that the packaging design is ready for printing, the prepress user may send the finalized packaging design to the CPG owner for a final approval. In some instances, the CPG owner may simply review the electronic file and may send a message or other communication indicating his or her approval. In other instances, the approval process may be similar to the approval process detailed above in connection with the FPO barcode and FIG. 5. That is, the CPG owner, on receiving and viewing the finalized packaging design, may click (activate) the selectable link associated with the prepress ID barcode in the waste area of the packaging design. Selection of the link initiates an HTTP request to the barcode server 12, wherein the HTTP request includes the prepress ID number. The barcode server 12 correlates the prepress ID number to the final barcode used in the packaging design and provides the CPG owner with barcode data, which may include an image of the final barcode, the UPC number, goods description, etc. In some cases, the barcode server 12 may provide the CPG owner with a checklist of items to review or consider, or a set of parameters selected or measured with regard to the barcode. The results of prepress-stage testing performed by third party quality certification service-providers may also be shown. The barcode server 12 also provides the CPG owner with an option of approving or disapproving of the final barcode. An approval is recorded and notice is sent to the prepress user; a disapproval is recorded and notice (possibly with reasons or suggestions for change) is sent to the prepress user.

Once the prepress user receives CPG owner approval of the finalized design, the prepress user can initiate the printing process by having printing plates prepared based in the finalized packaging design. The print job is then run on the printing press.

If, for some reason, the CPG owner revisits the barcode server 12 and disapproves of a barcode after having approved the barcode (whether FPO or final), a notice may be sent to the prepress user advising that approval of the barcode has been withdrawn and all work should cease; print jobs, if initiated, should be halted and cancelled.

In some instances during the design process, the designer may wish to re-order an FPO barcode. As the packaging design evolves, the designer may need to re-order an FPO barcode with a different color, different magnification, or to correct an error discovered in the UPC number of or associated data like the good description. Accordingly, if the designer clicks on the selectable link 304 (FIG. 4), the designer may log into the barcode server 12 (FIG. 2) and will be provided with a designer-specific FPO barcode re-ordering page. Through such a page, the designer may modify various parameters, such as color, magnification, etc., and may request re-generation of the FPO barcode. In one embodiment, this results in generation of a new FPO barcode ID number. All old FPO barcode ID numbers may be invalidated as soon as one FPO is approved by the CPG or tested by the QA certification service-provider so that the old FPO barcode is not inadvertently used in the packaging design, or so that if it is accidentally used in the design the CPG owner will detect the error when the CPG owner attempts to access the barcode server 12 through the selectable link in the old FPO barcode. Similarly, old final barcodes may be invalidated as soon as one final barcode ID is approved by the CPG or tested by the QA certification service-provider.

In another variation, the prepress 18 system may include a docketing system or a production server. Prepress sites typically use docketing systems or a production server to plan, quote, prepare working materials, do cost accounting, etc. In this variation of the present application, the docketing system or production server may include one or more API configured to obtain or receive FPO barcode data from the barcode server 12, for example in response to selection of the selectable link in the FPO barcode. The docketing system or production server is then populated with the same barcode data contained in the barcode server (the APIs may be configured to translate field names appropriately for a given docketing system configuration). The docketing system or production server may include a module or component that permits the user to request a final barcode through this system. That is, the docketing system or production server, having received the data from the barcode server 12, may display or provide a selectable button or link for ordering a final barcode. Selection of the button or link then generates an HTTP request from the docketing system or production server to the barcode server 12 in a similar manner to that described above in connection with FIG. 6. The docketing system or production server may, in one embodiment, have associated a docket-barcode-insert URL to which the barcode server can send barcode data for populating the docketing system or production server fields.

Figure 7:
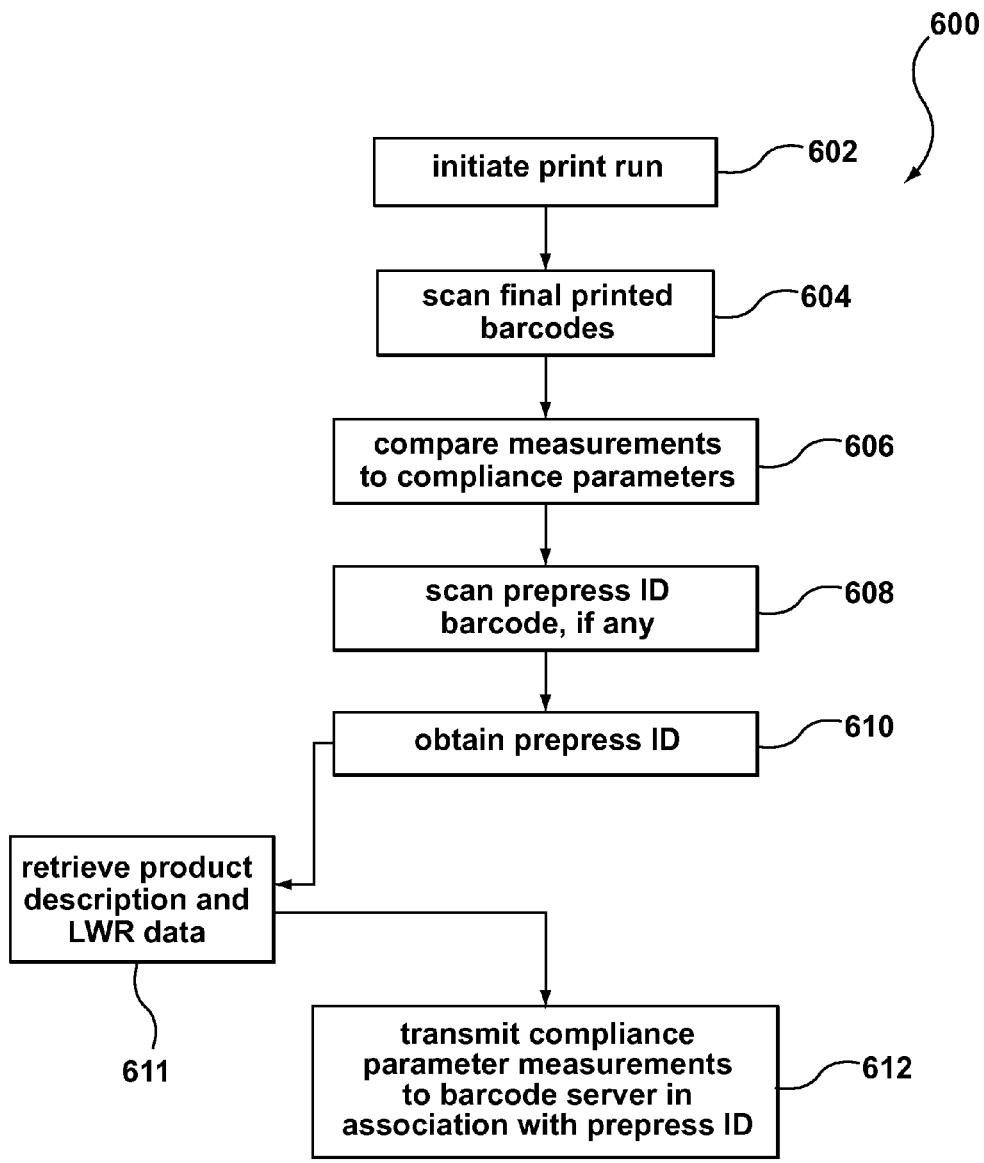
FIG. 7 shows, in flowchart form, an example method for gathering and storing printing press data.

Reference is now made to FIG. 7, which shows, in flowchart form, a method 600 of dynamically obtaining printing press data.

The method 600 is implemented by software executing on a processor in a ScanRight™ device at the printing site. The ScanRight™ device may be application-specific electronic device or a general purpose computer perhaps with a barcode scanning peripheral device. In some embodiments, the ScanRight™ device may be integrated within a verifier 22 (FIG. 2); however, in many instances, the ScanRight™ device is a separate device that is connected to and in communication with the verifier 22. The verifier 22 is configured to scan final printed barcodes on the printed packaging to measure the barcodes against various compliance parameters. The verifier 22 may output the measurement data and/or compliance data to a display screen and/or through a data port and/or to a data file. The ScanRight™ device may be configured to compare the measured data from the verifier 22 to compliance parameters, if not done by the verifier 22. In some cases, the ScanRight™ device may perform additional analysis and evaluation of the measurements. The ScanRight™ device is also configured to transmit measurements and/or compliance parameters to the barcode scanner 12 (FIG. 2). The transmitted data is sent in association with the prepress ID number so that the barcode scanner 12 is able to associate the data with a particular final barcode and to associate the data with a given printing press.

Example measurements include magnification, ink gain, encodation, etc.

Example compliance parameters that may be evaluated include ANSI/ISO parameters, such as Minimal Reflection, Symbol contrast, Decodability, Decode, Edge Contrast, Modulation, Defects, etc.

Referring still to FIG. 7, operation 602 represents the initiating of the print run on the printing press. In operation 604, the final printed barcodes are scanned. Operation 604 may be carried out by having press operators utilize the verifier 22 to scan the final printed barcodes. The press operators may scan every printed barcode or a selection of them. In some instances, the scanning may be automated without requiring handling of the packaging material. In some instances, the scanning may be done by the verifier 22; in others, the scanning may be done by a barcode scanner that is part of the ScanRight™ device.

In operation 606, the scanning of the barcode may produce measurement results which may then be tested or evaluated against pre-established compliance parameters. Although not shown in FIG. 7, thresholds may be set that trigger an alarm or other indicator to the press operator if a measurement indicates a problem in the printing of the barcode. In some instances, the alarm or other indicator may include suggestions for remedial action or solutions to correct the problem.

In operation 608, the prepress ID barcode (if any) is scanned by the ScanRight™ device. Accordingly, the ScanRight™ device obtains the prepress ID number and is able to associate it with the print job and the measurement data obtained from the verifier 22 regarding the final barcode. The ScanRight™ device is also able to retrieve product description and LWR information from the barcode server 12, providing accurate information at press-side without typing. If no prepress ID barcode is printed, then the press operator may input product description and LWR information. This is reflected in operations 610 and 611.

The ScanRight™ device is configured to transmit the measurement data and perhaps compliance or evaluation data to the barcode server 12, together with the associated prepress ID number. The data may be transmitted each time it is scanned, when the press operator chooses to record a result, in batches, or after the print job is complete, depending on the implementation. In some cases, the ScanRight™ device may also send a report or notice to the prepress user regarding compliance data, for example the ink gain or other parameters so that the prepress user is able to evaluate the effectiveness of the LWR they selected and adjust if necessary.

Advantageously, this data gathering process provides the barcode server 12 with abundant data regarding the printing characteristics and parameters of the printing press for a given actual print job. This provides far more accurate and current print data than an infrequent "fingerprinting" test, or an infrequent barcode certificate. As a result the barcode server 12 is able to refine the thresholds and print parameters associated with that printing press such that the next barcode intended to be printed on that press will print more accurately because the barcode server 12 may be configured to accept LWR and other print parameters within a range tailored to the specific print characteristics of that press. The gathering and storage of the actual print run statistical data regarding barcode measurements also provides abundant compliance data for the benefit of the CPG and the prepress user and press operators.

Certain adaptations and modifications of the described embodiments can be made. Therefore, the above discussed embodiments are considered to be illustrative and not restrictive.

What is claimed is:

1. A method of facilitating a barcode printing job at a server, wherein the method is performed by the server, the method comprising:
    receiving a request for a For Position Only (FPO) image from a remote system, wherein the request includes a product number to be encoded in the FPO image and product information, wherein the FPO image is suggestive of a barcode and not necessarily a proper scannable final barcode of the barcode printing job;
    generating the FPO image encoding the product number;
    assigning a unique identifier to the generated FPO image which is indicative of the barcode printing job;
    generating an FPO image file, wherein the FPO image file includes the generated FPO image with a selectable link to the server, wherein the selectable link contains the unique identifier; and
    transmitting the FPO image file to the remote system.

2. The method of claim 1, wherein the FPO image file includes a text block containing product information and the selectable link.

3. The method of claim 2, wherein the text block overlays at least a portion of the generated FPO image.

4. The method of claim 1, wherein the selectable link is configured to, when selected, cause generation of an HTTP request addressed to the server and containing the unique identifier.

5. The method of claim 4, wherein the FPO image file comprises a mark-up language file, and wherein the selectable link comprises a hyperlink configured to be selectable when the mark-up language file is viewed in a mark-up language viewer.

6. The method of claim 5, wherein the mark-up language is one of HTML, XHTML, XML, and PDF.

7. The method of claim 1, wherein the remote system is a packaging design system, and wherein the method further comprises including the FPO image file into an electronic packaging design file at the packaging design system.

8. The method of claim 1, wherein receiving the request comprises receiving a Consumer Packaging Goods (CPG) identifier, and wherein the method further comprises storing the FPO image at the server in association with the product information, the CPG identifier and the unique identifier.

9. The method of claim 8, further comprising:
    receiving a request for access to the server from a Consumer Packaging Goods (CPG) system, wherein the request includes the unique identifier;
    receiving login information from the CPG system corresponding to a CPG identity matching the CPG identifier;
    providing the CPG system with an approval page associated with the FPO image; and
    receiving and recording approval of the FPO image from the CPG system.

10. A method of generating a final barcode at a server, wherein the method is performed by the server, the method comprising:
    receiving a request from a prepress system for the final barcode, wherein the request includes a unique identifier;
    associating the unique identifier with a For Position Only (FPO) barcode stored at the server, wherein the FPO barcode encodes a product number;
    verifying that the FPO barcode has a Consumer Packaging Goods (CPG) approval recorded from a Consumer Packaging Goods (CPG) system in association therewith;
    receiving at least one printing parameter from the prepress system;
    generating the final barcode encoding the product number based, in part, on the at least one printing parameter; and
    transmitting the final barcode image to the prepress system.

11. The method of claim 10, further comprising generating a prepress ID number, encoding the prepress ID number in a prepress ID barcode, and transmitting the prepress ID barcode to the prepress system.

12. The method of claim 11, wherein the prepress ID barcode includes a selectable link, and wherein the selectable link contains the prepress ID number.

13. The method of claim 12, further comprising:
    receiving a request for access to the server from the CPG system, wherein the request includes the prepress ID number;
    receiving login information from the CPG system corresponding to a CPG identity associated with the prepress ID number and the FPO barcode;
    providing the CPG system with an approval page associated with the final barcode; and
    receiving and recording approval of the final barcode from the CPG system.

14. The method of claim 10, further comprising, at the prepress system, inserting the final barcode into an electronic packaging design file.

15. The method of claim 14, further comprising, at the prepress system, automated testing of the final barcode in the electronic packaging design file.

16. The method of claim 15, wherein the automated testing comprises comparing the FPO barcode to the final barcode to confirm they have the same dimensions, magnification, placement in the packaging design, and encode the same product number.

17. A method of generating a barcode at a server, wherein the method is performed by the server, the method comprising:
- receiving a request for a barcode from a remote system, wherein the request includes a product number to be encoded in the barcode and product information;
- generating a For Position Only (FPO) barcode encoding the product number;
- assigning a unique identifier to the generated FPO barcode;
- generating an FPO barcode image, wherein the FPO barcode image includes the generated FPO barcode and a selectable link to the server, wherein the selectable link contains the unique identifier;
- transmitting the FPO barcode image to the remote system, wherein receiving the request comprises receiving a Consumer Packaging Goods (CPG) identifier, and wherein the method further comprises storing the FPO barcode at the server in association with the product information, the CPG identifier and the unique identifier; and
- receiving a request for access to the server from a Consumer Packaging Goods (CPG) system, wherein the request includes the unique identifier;
- receiving login information from the CPG system corresponding to a CPG identity matching the CPG identifier;
- providing the CPG system with an approval page associated with the FPO barcode; and
- receiving and recording approval of the FPO barcode from the CPG system.

18. The method of claim 17, wherein the FPO barcode image includes a text block containing product information and the selectable link.

19. The method of claim 17, wherein the selectable link is configured to, when selected, cause generation of an HTTP request addressed to the server and containing the unique identifier.

20. The method of claim 19, wherein the FPO barcode image comprises a mark-up language file, and wherein the selectable link comprises a hyperlink configured to be selectable when the mark-up language file is viewed in a mark-up language viewer.

* * * * *